United States Patent
Ip et al.

(10) Patent No.: US 7,400,500 B2
(45) Date of Patent: Jul. 15, 2008

(54) LOW-POWER COMPACT COMPUTER

(75) Inventors: Michael Ip, Fremont, CA (US); Samuel Chau, Cupertino, CA (US); Michael McCullough, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 262 days.

(21) Appl. No.: 11/264,576

(22) Filed: Oct. 31, 2005

(65) Prior Publication Data

US 2007/0097624 A1 May 3, 2007

(51) Int. Cl.
*G06F 1/20* (2006.01)
(52) U.S. Cl. .................. 361/687; 165/80.4; 455/557; 600/505
(58) Field of Classification Search ............ 455/41, 455/517, 557, 163; 165/104.21, 80.4; 361/713, 361/679–687, 724–727; 700/300; 600/505–506
See application file for complete search history.

(56) References Cited

U.S. PATENT DOCUMENTS

| 5,898,572 | A | * | 4/1999 | Shennib et al. ............ 361/713 |
| 6,044,427 | A | | 3/2000 | Klein |
| 6,106,566 | A | | 8/2000 | Klein |
| 6,393,573 | B1 | | 5/2002 | Gillespie et al. |
| 6,567,271 | B2 | * | 5/2003 | Stone et al. ................ 361/724 |
| 2001/0016918 | A1 | | 8/2001 | Alexander et al. |
| 2003/0013412 | A1 | * | 1/2003 | Kardach et al. ............... 455/41 |
| 2005/0145371 | A1 | * | 7/2005 | DiStefano et al. ...... 165/104.21 |
| 2006/0007151 | A1 | * | 1/2006 | Ram .......................... 345/163 |

* cited by examiner

*Primary Examiner*—Hung V Duong

(57) ABSTRACT

A low-power compact computer comprises a processor having relatively low-power consumption, a supporting chipset having conventional power consumption, and a conventional random access memory storage circuit.

14 Claims, 3 Drawing Sheets

LOW-POWER COMPACT COMPUTER

BACKGROUND

Computer technology has increased rapidly over the past few decades. As integrated circuits for performing the central processor unit (CPU) functions, such as Intel's Pentium, have evolved, the power requirements have also increased dramatically. The power requirements are listed in terms of total dissipated power (TDP). The greater the TDP, the more power the chip needs to operate, and also the more heat the chip will generate. This heat causes problems for engineers designing compact computer systems. For example, a typical Pentium CPU for desktop applications has a TDP of 84-115 Watts. The upcoming Pentium dual core CPU is specified at 130 W. Compatible conventional desktop chipsets are specified with TDP of about 11-20 W. If an engineer were to design a high power processor into a small chassis, the cooling requirements would dictate numerous fans causing significant undesirable noise and extended airflow outside the chassis. For example, conventional computers generate acoustic noise in the range of 35 dBA which is noticeable to many users. Any increase in noise may be annoying to users.

With regard to laptop computers, engineers can select mobile versions of CPUs, which are less power hungry but also more expensive. For example, a mobile Pentium has a TDP of 22-27 W. What's more, the mobile CPUs often require specific mobile chipset combinations and mobile memory configurations. While the mobile chipsets are specified with only marginally lower TDP (e.g. about 5-11 W), they are significantly more expensive than desktop chipsets. In addition, mobile memory (small outline dual inline memory modules) is often significantly more expensive than desktop memory. This is one reason why laptop computers tend to be more expensive than desktop computers.

What is needed is a low-power compact computer for desktop applications that employs low power CPU advantages while also providing a price point that is commercially attractive to desktop consumers.

SUMMARY

A low-power compact computer comprises a processor having relatively low-power consumption, a supporting chipset having conventional power consumption, and a conventional random access memory storage circuit.

DRAWINGS

The present invention is illustrated by way of example, and not by way of limitation, in the figures of the accompanying drawings and in which like reference numerals refer to similar elements and in which.

DETAILED DESCRIPTION

The present invention is described in detail with reference to exemplary embodiments thereof as illustrated in the accompanying drawings. In the following description, numerous specific details are set forth in order to provide a description of the best mode of the invention. It will be apparent, however, to one skilled in the art, that the present invention may be practiced without some or all of these specific details. For example, while the invention refers to processors manufactured by Intel, such as a Pentium processor, other processors made by other manufacturers are anticipated to work well with the invention.

The invention provides a compact computer for desktop applications that consumes low power and generates little undesirable noise and extended airflow outside the chassis. The invention supports the assembly of the CPU, supporting chipset, video, motherboard I/O circuits, disk drives, power supply and other components into a small chassis. This is advantageous for the manufacturer since it takes less space and cost to ship, and advantageous for consumers since it is light and takes less space on the desktop or under the desk.

Figure 1:
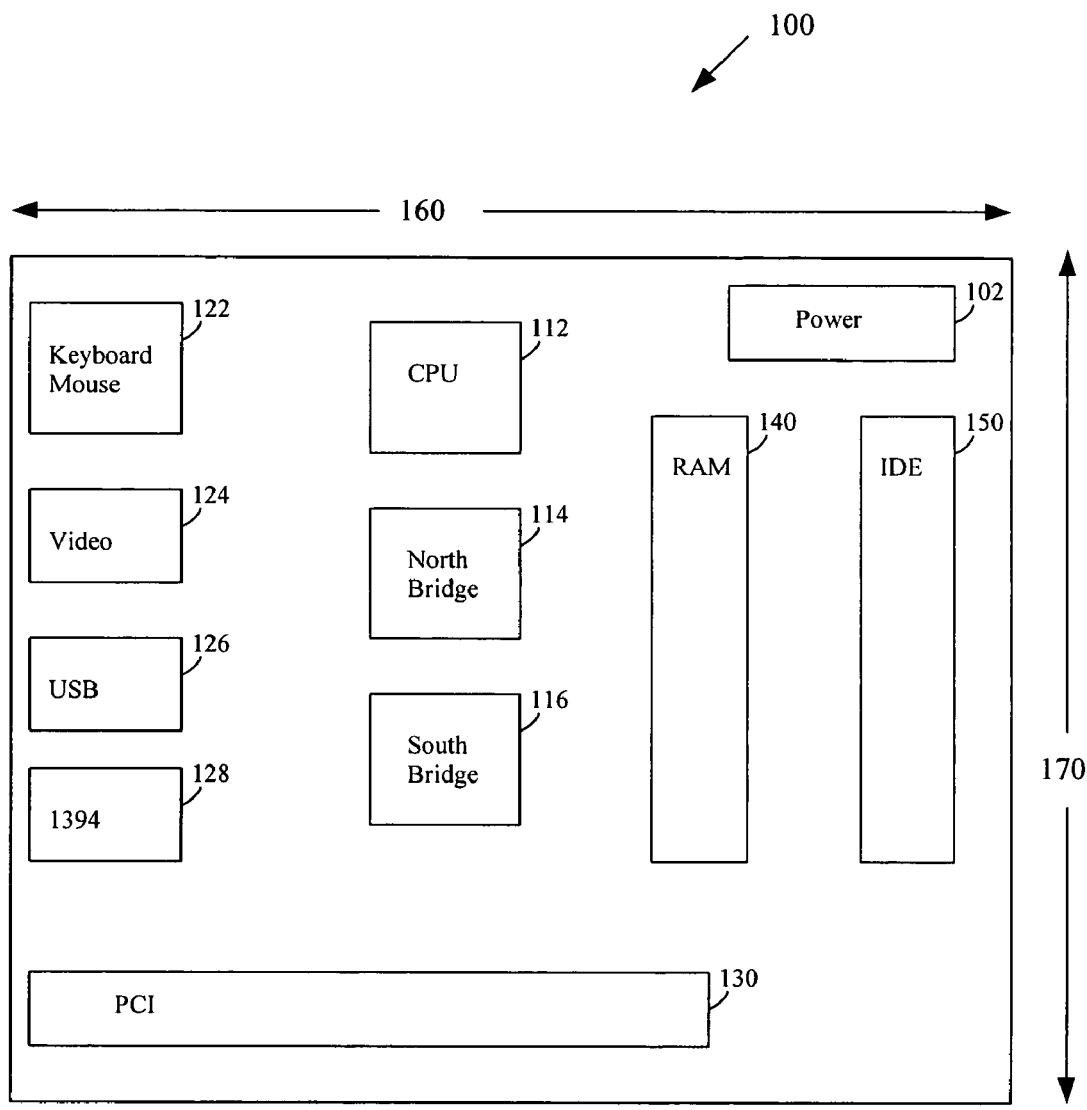
FIG. 1 depicts a low-power compact computer motherboard according to an embodiment of the invention.

FIG. 1 depicts a low-power compact computer motherboard 100 according to an embodiment of the invention. The motherboard includes a number of elements, for example, integrated circuits 112-116, and connectors 122-128. The connectors provide input and output for various power and signals. For example, power supply 202 provides power to the motherboard via power connector 102, connector 122 is adapted to connect to a keyboard and a mouse, connector 124 is adapted to connect to a video monitor, connector 126 is adapted to connect to a universal serial bus (USB), connector 128 is adapted to connect to a IEEE 1394 device such as a video camera, and connector 130 is adapted to receive an expansion card in an exemplary PCI form factor.

The primary circuit elements of the motherboard include a central processor 112, north bridge 114 and south bridge 116. The central processor is, for example, an Intel Pentium or Celeron mobile processor and the bridge circuits 114, 116 are called a supporting chipset for the processor. The chipset is responsible for communicating with other circuit elements on the motherboard including the random access memory (RAM) 140 and the disk drives 204 via the IDE controller 150. In one aspect, the invention uses a serial ATA interface for the hard disk drive. The chipset also controls input and output to and from the processor for communicating with various computer peripherals, for example, a keyboard, mouse, or other peripherals attached to connectors 122-128.

The invention provides a relatively small motherboard compared to a conventional ATX form factor motherboard size of 23.5 cm by 30.5 cm, for example. In one aspect of the invention, the motherboard is constructed according to a mini ITX form factor, which is 17 cm by 17 cm (corresponding to dimension reference numbers 160 and 170). This compact design is advantageous for requiring a small amount of space, but can become very hot when used with standard processors and chipsets since such processors are designed for conventional large ventilated cases such as an ATX form factor case, for example.

One embodiment of the invention provides a system with a total power budget of 108 W in a relatively small case. As described above in the background, desktop Pentium processors often have power requirements of 84-115 W. Naturally, using such a high power-consuming processor simply would not work in this embodiment because it would take up nearly all (or more than) the power budget. Consequently, the invention employs a mobile processor that requires less power. In one aspect, the invention employs a processor with a power consumption of less than 45 W, in a preferred aspect, the processor consumption is less than 35 W, and in a most-preferred aspect, the processor consumption is less than 25 W. Types of processors that fulfill these requirements are mobile processors, for example, the Pentium mobile processor with a TDP of 27 W. The conventional desktop north bridge circuit consumes approximately 6-14 W and the conventional desktop south bridge circuit consumes approximately 5-6 W.

One problem with using a mobile processor is that the manufacturer often specifies that the mobile processor is only validated for use with a mobile chipset and mobile memory. Unfortunately, mobile chipsets and mobile memory are expensive and do not use significantly less power than a desktop chipset and desktop memory. Accordingly, one aspect of the invention combines a mobile processor with a desktop chipset and conventional memory (standard dual inline memory modules, DIMMs, versus mobile memory small outline DIMMs). However, combining a mobile processor with a desktop chipset is problematic because the combination is outside the validation model and the circuits may not communicate with one another very well. This is the case with a mobile Pentium processor and an Intel desktop chipset. In fact, in order to obtain cooperation between a mobile Pentium processor and Intel desktop chipset, several lines of basic input-output system (BIOS) were modified.

The advantage of using a low-power processor with other conventional desktop supporting circuits like the chipset and memory is an optimal price point for the given power consumption. The invention strikes a balance where the added expense of the processor is offset by the lower expense of the chassis in terms of size. In addition, the chassis is typically about 20-30% cooler than a conventional computer chassis.

Figure 2A:
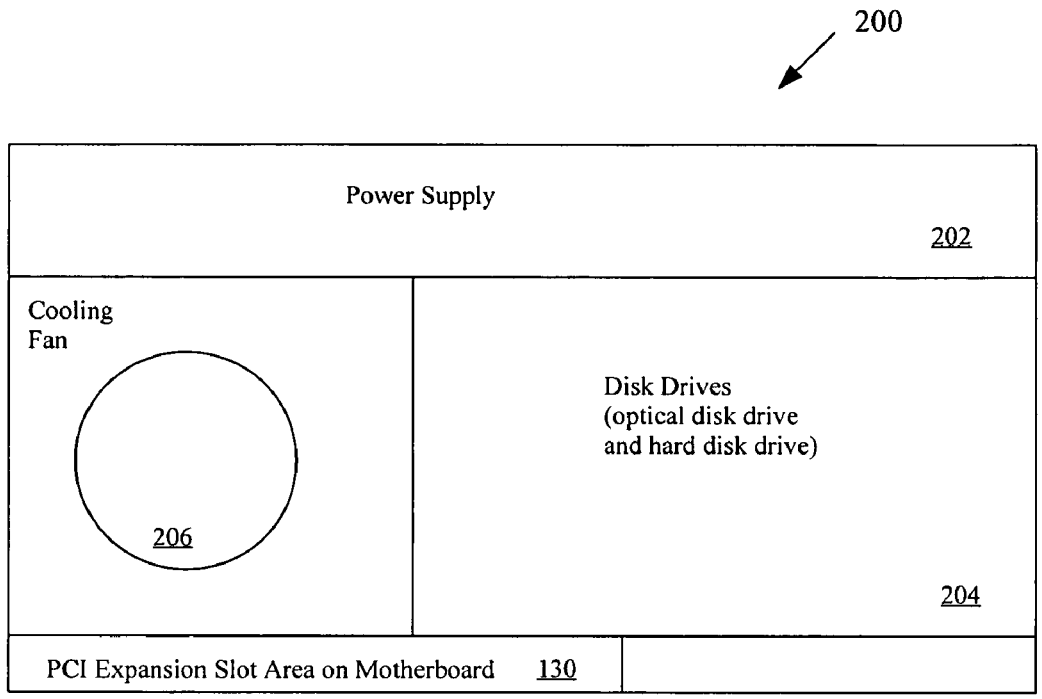
FIG. 2A depicts a top view of a low-power compact computer showing internal components according to an embodiment of the invention.
Figure 2B:
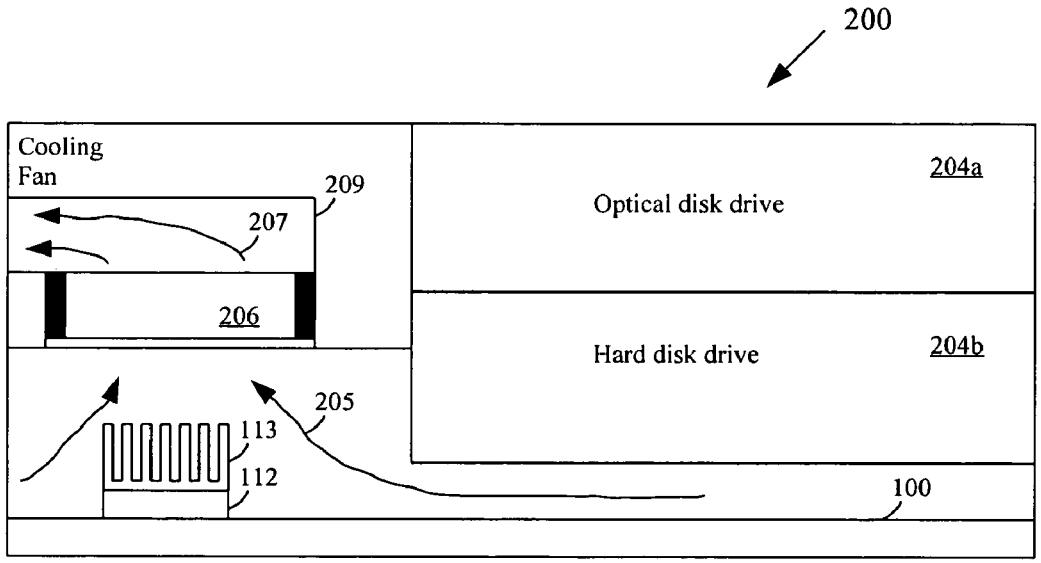
FIG. 2B depicts a side view of a low-power compact computer showing internal components according to an embodiment of the invention.
Figure 2C:
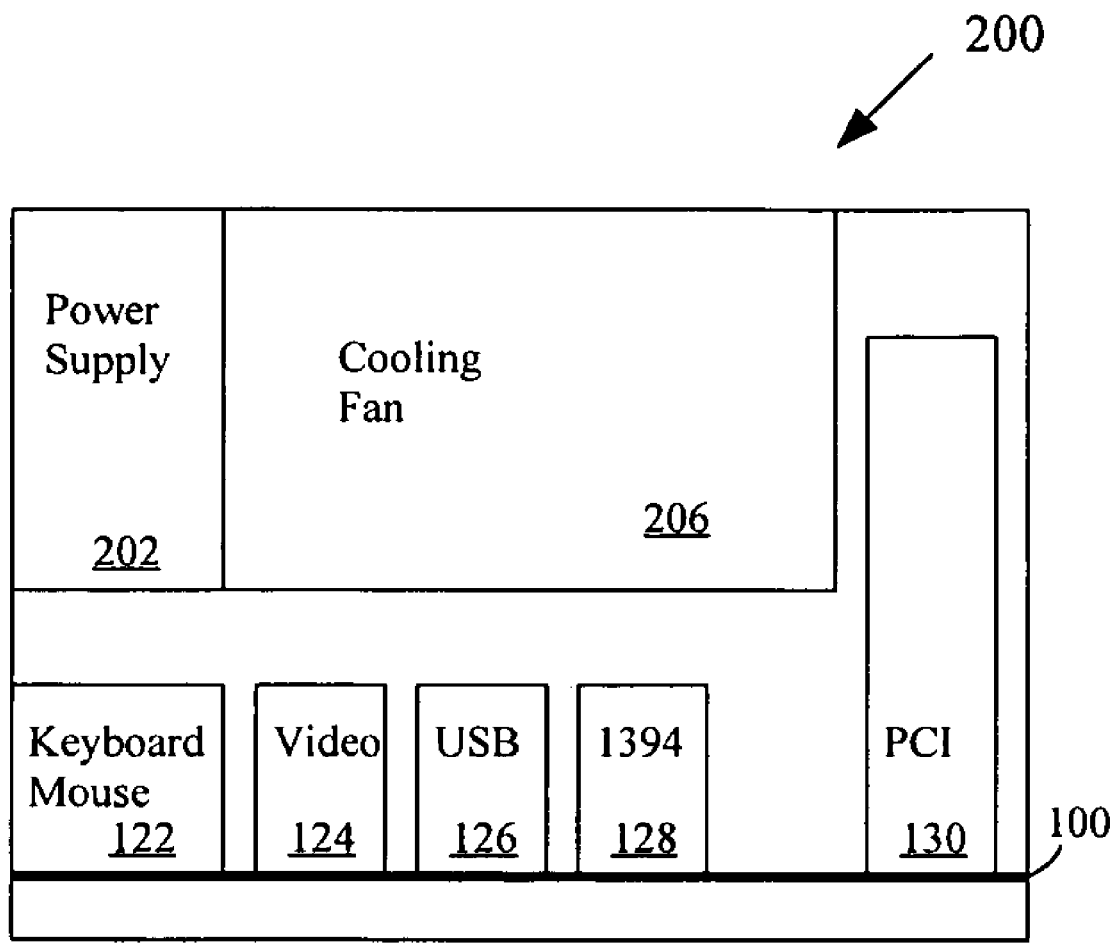
FIG. 2C depicts a rear view of a low-power compact computer showing internal components according to an embodiment of the invention.

FIGS. 2A-C depict views of a low-power compact computer 200 showing internal components according to an embodiment of the invention. These perspectives demonstrate how the components are packed into the compact housing to achieve the power and performance capabilities of the invention, while also keeping the components sufficiently cool for operation and sufficiently quiet for the consumer. In one embodiment the chassis is about 32 cm long, 10 cm wide and 24 cm tall.

FIG. 2A depicts a top view of a low-power compact computer 200 showing internal components according to an embodiment of the invention. A power supply 202 is located along the side of the chassis and a location for disk drives 204 is provided adjacent the front of the chassis. Cooling fans 206 are located near the rear of the chassis to cool the computer components and especially the motherboard. The motherboard expansion slot 130 is open for a PCI expansion card. While the exemplary embodiment depicts the invention in a particular orientation, such orientation is arbitrary and the invention can be deployed by a user in other orientations.

FIG. 2B depicts a side view of a low-power compact computer 200 showing internal components according to an embodiment of the invention. As can be seen by this side view, the location for disk drives 204 includes a location for an optical disk drive 204a (e.g. CD or DVD drive) and a location for a hard disk drive 204b. The side view also shows the placement of the motherboard 100 in the chassis.

FIG. 2C depicts a rear view of a low-power compact computer 200 showing internal components according to an embodiment of the invention. The rear view shows the location of the motherboard and access to the connectors 122-128 for connection to peripheral devices.

By using a relatively low-power processor along with desktop chipset circuits, the invention has an improved uniform heat density compared to conventional desktop computers. This improved uniformity in heat distribution reduces hot spots in the computer chassis and makes the components easier to cool. Referring to FIGS. 2A-C, the cooling fan 206 can dissipate the heat better with uniform heat density and will make less noise than if the heat density was highly irregular.

One embodiment of the invention employs a large profile fan that has the ability to cool the motherboard area, while also turning at relatively slow RPMs compared to conventional computer chassis fans. In one aspect, the fan is an 80 mm fan with correspondingly sized fins. Referring to FIG. 2B, the CPU 112 is attached to a thermal heat sink 113 in close proximity to the fan. In one aspect, the CPU and heat sink are in close proximity to the fan and in a preferred aspect, the CPU and heat sink are located directly in front of the fan, which allows the system cooling solution to double as the processor cooling solution. In the exemplary embodiments, heat sink 113 does not include a fan, but in other embodiments, the heat sink may include a fan. Reference number 205 indicates exemplary intake air that is ducted from perforations in the chassis and flows over the motherboard and heat sink to toward the fan. The airflow is sufficient in the exemplary embodiment to forego an additional fan on the heat sink, which also helps to reduce acoustic noise. Reference number 207 indicates exemplary exhaust air that is ducted to perforations in the rear of the chassis via duct 209. This type of large profile fan transports the thermal heat out of the chassis, but generates significantly less acoustic noise than would conventional fans. The invention anticipates using multiple fans to cool the electronics as necessary, for example, the inventors anticipate incorporating a second fan for cooling the power supply and disk drives, which can also help cool the whole system. One or more fans can be located in the general area shown as cooling fan 206 in aspects of the invention.

By improving the heat uniformity in the computer, and improving the fan characteristics, as described herein, the system can maintain an acoustic noise level at or below 35 dBA, preferably at or below 30 dBA and most preferably at or below 28 dBA.

While the invention has been described in terms of several embodiments and the best mode, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A low-power compact computer comprising: a processor having relatively low-power consumption, a supporting chipset having conventional power consumption, a conventional random access memory storage circuit, a power supply, a hard disk drive, an optical disk drive, and a cooling fan, wherein the computer has a relatively uniform heat density.

2. The low-power compact computer of claim 1, wherein: the processor is a mobile processor; and the supporting chipset is a desktop chipset.

3. The low-power compact computer of claim 1, wherein: the processor is a Pentium mobile processor; and the supporting chipset is a Pentium desktop chipset.

4. The low-power compact computer of claim 1, wherein total power consumption does not exceed 108 W.

5. The low-power compact computer of claim 1, wherein the processor power consumption does not exceed 45 W.

6. The low-power compact computer of claim 1, wherein the processor power consumption does not exceed 35 W.

7. The low-power compact computer of claim 1, wherein the processor power consumption does not exceed 25 W.

8. The low-power compact computer of claim 1, wherein the processor power consumption does not exceed 25 W.

9. A low-power compact computer comprising: a processor having relatively low-power consumption, wherein the processor is a mobile processor, a supporting chipset having conventional power consumption, wherein the supporting chipset is a desktop chipset, a conventional random access memory storage circuit, a power supply, a hard disk drive, an optical disk drive, and a cooling fan, wherein the computer has a relatively uniform heat density.

10. A low-power compact motherboard for use in a computer, the motherboard comprising: a processor having a relatively low-power specification, a supporting chipset having a conventional power specification, and a conventional random access memory storage circuit, wherein the motherboard has a relatively uniform heat density.

11. The low-power compact motherboard of claim 10, wherein the processor power consumption does not exceed 45 W.

12. The low-power compact motherboard of claim 10, wherein the processor power consumption does not exceed 35 W.

13. The low-power compact motherboard of claim 10, wherein the processor power consumption does not exceed 25 W.

14. A low-power compact computer comprising: a low-power compact motherboard, a processor having relatively low-power consumption, a supporting chipset having conventional power consumption, a conventional random access memory storage circuit, a power supply, a hard disk drive, an optical disk drive, and a cooling fan having a fan noise level at or below 35 dBA, wherein the computer has a relatively uniform heat density and the processor power consumption does not exceed 25 W.

\* \* \* \* \*